J. F. WINCHELL.
Fruit Drier.
No. 61,130.
2 Sheets—Sheet 1.
Patented Jan. 8, 1867.
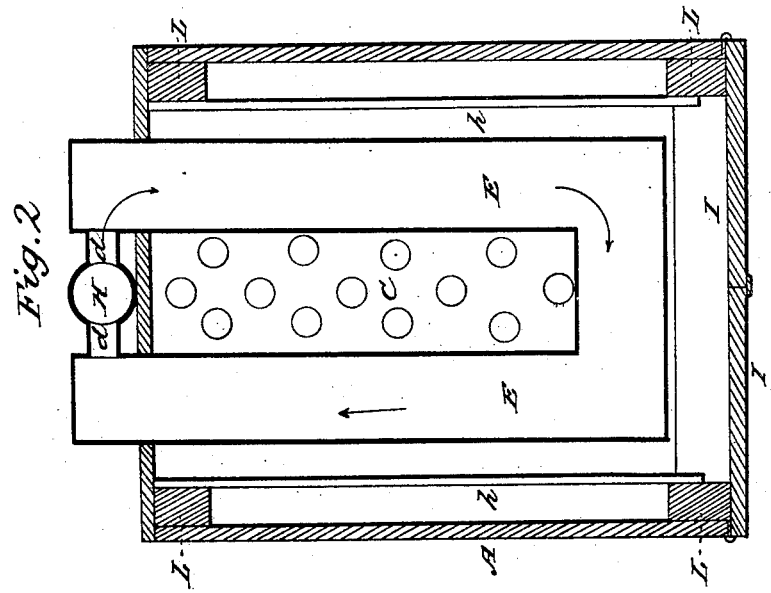
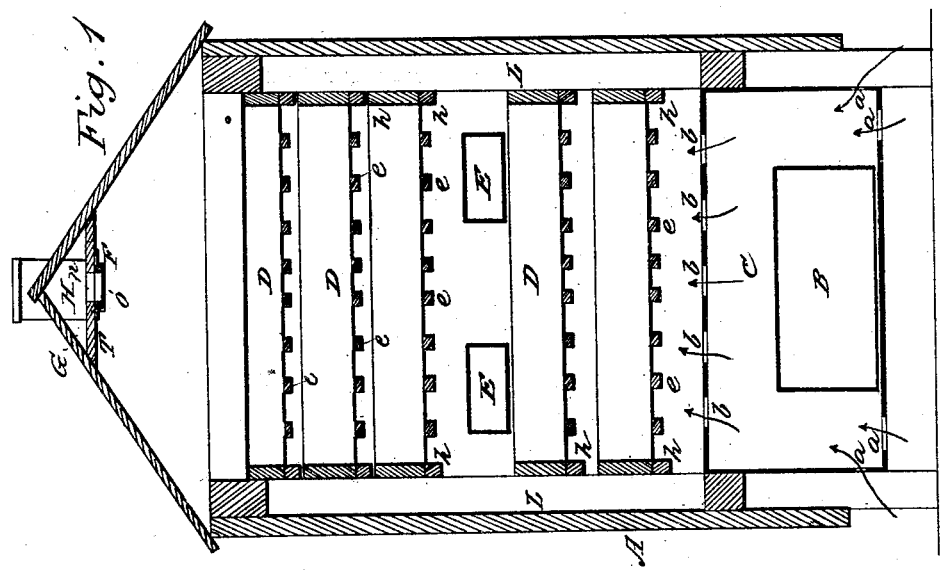
Witnesses:
P. F. Dodge.
Alex Mahon
Inventor:
James F. Winchell.
By W. Dodge J. F. WINCHELL.
Fruit Drier.
No. 61,130.
2 Sheets—Sheet 2.
Patented Jan. 8, 1867.
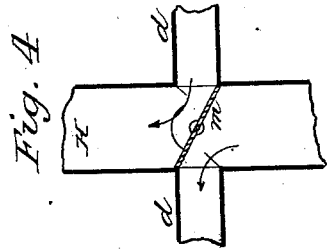
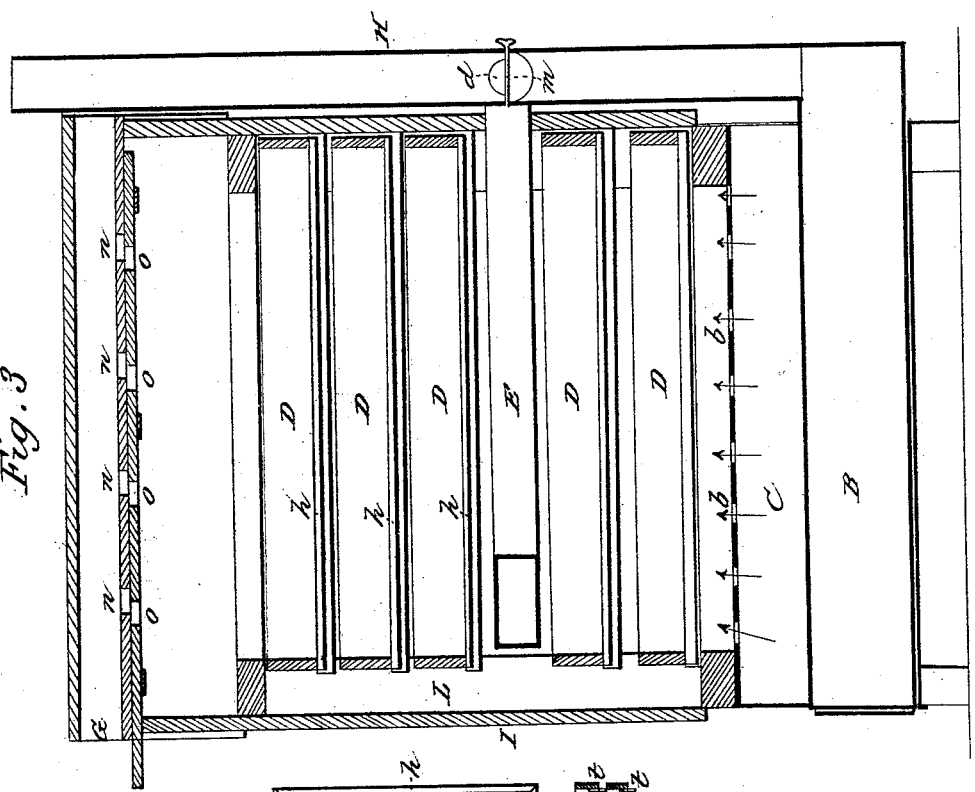
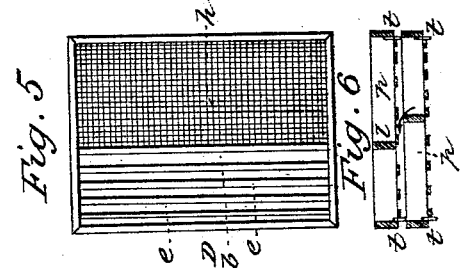
Witnesses:
Inventor:
James F. Winchell.

United States Patent Office.

JAMES F. WINCHELL, OF SPRINGFIELD, OHIO, ASSIGNOR TO HIMSELF AND GEORGE C. STEELE.

Letters Patent No. 61,130, dated January 8, 1867.

---

IMPROVED FRUIT-DRYING HOUSE.

---

*The Schedule referred to in these Letters Patent and making part of the same.*

---

TO ALL WHOM IT MAY CONCERN:

Be it known that I, JAMES F. WINCHELL, of Springfield, Clark county, Ohio, have invented certain new and useful improvements in Fruit-Drying Houses; and I do hereby declare that the following is a full, clear, and exact description thereof, reference being had to the accompanying drawings, making part of this specification, and to the letters of reference marked thereon, like letters indicating like parts wherever they occur.

Figure 1 is a transverse vertical section.

Figure 2, a transverse horizontal section.

Figure 3, a longitudinal vertical section.

Figures 4, 5, and 6, views of portions detached.

My invention consists in a novel construction of the heating apparatus, and of the drawers for holding the fruit, and in the special arrangement of valves for controlling the heat and permitting the escape of the moisture evaporated from the fruit during the process of drying.

I construct a small building or house, A, of any suitable size and material, having a series of slats, $h$, arranged horizontally along each side, on which to place the drawers D. In the bottom of the house A is placed a furnace, B, surrounded with a hot-air chamber, C, having holes $a$ in the bottom and sides, as shown in fig. 1, for the admission of cold air, which, when heated by the furnace B, escapes through openings $b$, in the top of said hot-air chamber, as indicated by the arrows, this heated air circulating through the slatted bottoms of the drawers D among the fruit placed thereon. Near the top of the roof is placed a horizontal partition, T, as shown in figs. 1 and 3, having a series of openings, $n$, which are opened or closed at pleasure by a slide or register, F, having a series of corresponding openings, $o$. The gable ends are left open above the partition T, as represented at G. By these means the moisture which is evaporated from the fruit in the early stages of the drying process is permitted to escape into the air. A pipe, H, is attached to the rear end of the furnace, and ascends outside of the building, as shown clearly in fig. 3. At about one-third of its height this pipe H is connected by pipes $d$ on each side with a horizontal flue, E, extending entirely around on the inside of the house, as represented in fig. 2. At the point where this flue E connects with the pipe H by the side pipes $d$, a valve, $m$, is located in the pipe H, as represented in fig. 4. By turning this valve $m$, as there represented, the heat and smoke arising in the pipe H will be deflected into the tube $d$ on one side, and passing thence around through the flue E, and through the opposite tube $d$, back into pipe H, above the valve $m$, and then escape at the top of H. By this arrangement the heat, which would otherwise escape, may be utilized in a very perfect manner, and at the same time, by simply turning the valve $m$, the heat may be regulated as desired. The drawers D consist of the ordinary side-pieces, having slats $e$ nailed or otherwise secured to the bottoms, and have small vertical strips or blocks, $t$, secured to their inner back ends, as represented in fig. 6, to serve as guides when sliding on the slats $h$, the slats being attached at each end to the posts L, at the corners of the house, as represented in fig. 2. By these means I avoid the necessity of rabbeting either the edge of the drawers or of the slats $h$ in order to guide them and prevent their slipping off the slats when being shoved in or drawn out. In order to dry small fruits like currants, berries, &c., I provide a wire-gauze bottom, $p$, as represented in figs. 5 and 6. These bottoms $p$ are made removable, and simply rest on the slats $e$; they are made of such a size as to only partially cover the bottom of the drawer, and are provided at one edge with a vertical bar, $l$, of proper length to fit in the drawer, as shown in figs. 5 and 6. When small fruit is dried it covers the bottom of the drawers more closely than the larger fruit, and hence does not permit a free circulation of the hot air up through the drawers and the fruit. For this reason I make the removable bottoms less in width than the drawers, and arrange them alternately on opposite sides, as represented in fig. 6, by which means a portion of the bottom of each drawer is left more open to permit the ascent and free circulation of the hot air. These removable bottoms $p$, if made of wire, should be galvanized to prevent their being rusted or otherwise affected by the moisture and juice of the fruit. If preferred, these bottoms $p$ may be made of perforated zinc, or of wood or twine; but the galvanized wire I deem best fitted for the use. When not required for use, these bottoms $p$ may be lifted out and laid aside. I are doors covering one entire end.

Having thus described my invention, what I claim, is—

1. I claim a dry-house constructed substantially as described, and having the pipe H with its valve $m$ and the return flue E combined and arranged for joint operation, as herein described.

2. I claim the removable bottoms $p$, constructed of wire gauze or its equivalent, arranged to be used in connection with the drawers D, substantially as herein set forth.

3. I claim providing the drawers D with the guide-pieces $t$, as shown and described.

JAMES F. WINCHELL.

Witnesses:
 D. A. HARRISON,
 M. MOHKUN.